(12) United States Patent
Sato

(10) Patent No.: US 12,069,219 B2
(45) Date of Patent: Aug. 20, 2024

(54) INFORMATION PROCESSING SYSTEM WITH ABILITY TO INTERRUPT PROCESS BASED ON PAST DOCUMENT PROCESSING RECORD

(71) Applicant: FUJIFILM Business Innovation Corp., Tokyo (JP)

(72) Inventor: Chihiro Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 493 days.

(21) Appl. No.: 17/319,814

(22) Filed: May 13, 2021

(65) Prior Publication Data

US 2022/0201154 A1 Jun. 23, 2022

(30) Foreign Application Priority Data

Dec. 23, 2020 (JP) ................................. 2020-213512

(51) Int. Cl.
*H04N 1/00* (2006.01)
*H04N 1/32* (2006.01)

(52) U.S. Cl.
CPC ..... *H04N 1/32368* (2013.01); *H04N 1/00209* (2013.01); *H04N 1/00949* (2013.01); *H04N 1/0097* (2013.01)

(58) Field of Classification Search
CPC .... G06F 3/1204; G06F 3/1212; G06F 3/1214; G06F 3/1222; G06F 3/1226; G06F 3/1238; G06F 3/1256; G06F 3/1284; G06F 3/1267; G06F 3/1285; G06F 3/1288; G06F 40/274
See application file for complete search history.

(56) References Cited

U.S. PATENT DOCUMENTS

| | | | |
|---|---|---|---|
| 9,888,141 B2 | 2/2018 | Mihara | |
| 2003/0135428 A1* | 7/2003 | Smith | G06Q 30/0635 705/26.81 |
| 2011/0004614 A1* | 1/2011 | Chow | G06F 16/93 707/769 |
| 2011/0119189 A1* | 5/2011 | Clayton | G06Q 20/40 705/44 |
| 2014/0297698 A1* | 10/2014 | Tanimoto | G06F 16/1865 707/826 |
| 2022/0191341 A1* | 6/2022 | Ikeda | H04N 1/00949 |
| 2022/0311898 A1* | 9/2022 | Sato | G06F 40/103 |
| 2023/0108189 A1* | 4/2023 | Tomokuni | H04N 1/00949 358/1.15 |

FOREIGN PATENT DOCUMENTS

| | | | |
|---|---|---|---|
| JP | 2001147964 A | * | 5/2001 |
| JP | 2016-33719 A | | 3/2016 |

* cited by examiner

*Primary Examiner* — Henok Shiferaw
(74) *Attorney, Agent, or Firm* — Oliff PLC

(57) ABSTRACT

An information processing system includes a processor configured to: obtain a feature of a target document which is a document to be processed; and obtain information on a process performed by the information processing system on a past document which is a document that has the obtained feature and that has been processed in past in the information processing system.

11 Claims, 10 Drawing Sheets

FIG. 2

| FLOW ID | FIRST | SECOND | THIRD | ... | N-TH |
|---|---|---|---|---|---|
| AAA | AAA- PLUG-IN DEFINITION 1 | AAA- PLUG-IN DEFINITION 2 | AAA- PLUG-IN DEFINITION 3 | ... | AAA- PLUG-IN DEFINITION n |
| BBB | BBB- PLUG-IN DEFINITION 1 | BBB- PLUG-IN DEFINITION 2 | BBB- PLUG-IN DEFINITION 3 | | BBB- PLUG-IN DEFINITION n |
| ... | ... | ... | ... | | ... |
| NNN | NNN- PLUG-IN DEFINITION 1 | NNN- PLUG-IN DEFINITION 2 | NNN- PLUG-IN DEFINITION 3 | | NNN- PLUG-IN DEFINITION n |

FIG. 3

| JOB ID | FLOW ID | DOCUMENT ID | WHETHER THERE HAS BEEN DISTRIBUTION PROCESS |
|---|---|---|---|
| xxxxx | FLOW ID 1 | OrgDocID1 | YES |
| yyyyy | FLOW ID 2 | OrgDocID2 | NO |
| ... | ... | ... | ... |
| zzzzz | FLOW ID n | OrgDocIDn | NO |

| PLUG-IN ID | DOCUMENT DATA | JOB ID | DOCUMENT ID | FLOW ID |
|---|---|---|---|---|
| AAAAA | xxxxx | JOB ID 1 | OrgDocID1 | FLOW ID 1 |
| AAAAA | Xxx | JOB ID 2 | OrgDocID2 | FLOW ID 2 |
| ... | ... | ... | ... | ... |
| BBBBB | XxxxxxxxX | JOB ID n | OrgDocIDn | FLOW ID Z |

41 ↗

INFORMATION PROCESSING SYSTEM WITH ABILITY TO INTERRUPT PROCESS BASED ON PAST DOCUMENT PROCESSING RECORD

CROSS-REFERENCE TO RELATED APPLICATIONS

This application is based on and claims priority under 35 USC 119 from Japanese Patent Application No. 2020-213512 filed Dec. 23, 2020.

BACKGROUND (i) Technical Field

The present disclosure relates to an information processing system.

(ii) Related Art

Japanese Unexamined Patent Application Publication No. 2016-33719 discloses an information processing apparatus including a selector that selects a processing unit to be executed by a processing controller from among a plurality of processing units defined as candidates to be executed after an identical processing unit.

In an information processing system that processes a document, for example, in response to an input of a document serving as a processing target, a predetermined process is executed on the document.

Here, if a document is processed without taking into consideration processes performed in the past in the information processing system, for example, a document that has already been processed may be processed again, and the document may be processed the number of times greater than that expected in the first place.

SUMMARY

Aspects of non-limiting embodiments of the present disclosure relate to enabling a user to grasp, in the case of processing a document in an information processing system, the contents of processes performed in the past by the information processing system on documents.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to: obtain a feature of a target document which is a document to be processed; and obtain information on a process performed by the information processing system on a past document which is a document that has the obtained feature and that has been processed in past in the information processing system.

BRIEF DESCRIPTION OF THE DRAWINGS

An exemplary embodiment of the present disclosure will be described in detail based on the following figures, wherein:

FIG. 2 is a diagram illustrating a flow management table;

FIG. 3 is a diagram illustrating a job management table;

FIG. 4 is a diagram illustrating a plug-in management table;

DETAILED DESCRIPTION

Hereinafter, an exemplary embodiment of the present disclosure will be described in detail with reference to the accompanying drawings.

Figure 1:
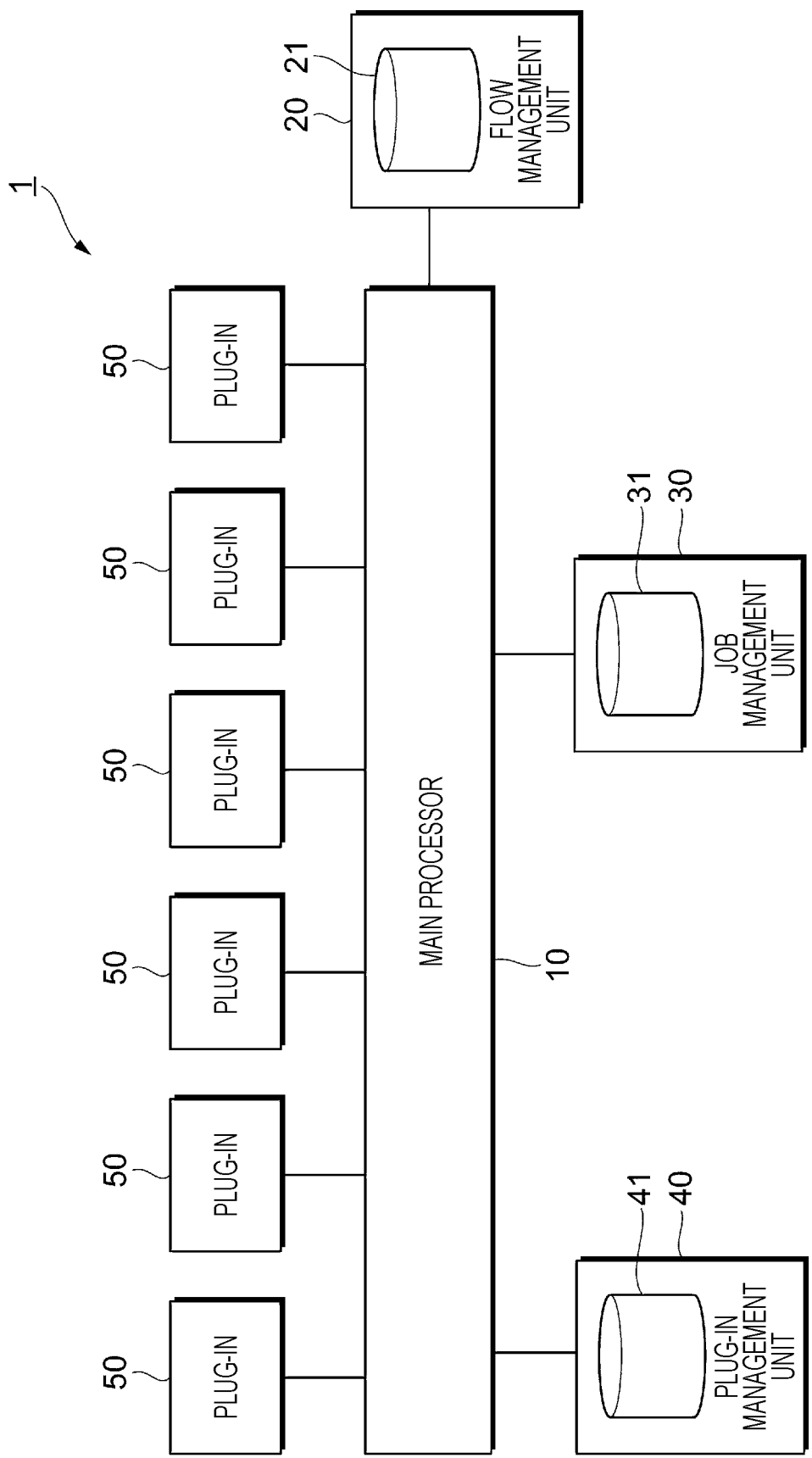
FIG. 1 is a diagram illustrating the overall configuration of an information processing system.

FIG. 1 is a diagram illustrating the overall configuration of an information processing system 1 according to the present exemplary embodiment.

The information processing system 1 of the present exemplary embodiment includes a main processor 10, a flow management unit 20, a job management unit 30, and a plug-in management unit 40.

The main processor 10 passes a document input to the information processing system 1 to a plug-in 50, and obtains the processing result from the plug-in 50. The main processor 10 performs the process of passing a document to a plug-in 50 and the process of obtaining the processing result from the plug-in 50 for the number of plug-ins 50 associated with a flow (described later).

Each of the plug-ins 50 performs a predetermined process on a document passed from the main processor 10, and returns the processing result (information on the processed document or the like) to the main processor 10.

The flow management unit 20 includes a flow management table 21. The flow management unit 20 registers information on a combination of a plurality of plug-ins 50 set by the user for each such combination in the flow management table 21.

FIG. 2 is a diagram illustrating the flow management table 21.

In the present exemplary embodiment, a flow identification (ID) is associated with each of combinations of plug-ins 50, set by the user, as indicated by reference numeral 2A. With the flow ID, each combination of plug-ins 50 is identified.

In the present exemplary embodiment, multiple plug-ins 50 are registered in the order of execution for each flow ID. In other words, information on the order of executing multiple plug-ins 50 is also registered in the flow management table 21.

In the present exemplary embodiment, a plug-in 50 executed first is registered in the "first" field in FIG. 2, which is the leftmost field, and plug-ins 50 executed thereafter are arranged rightward in FIG. 2.

A plug-in ID for identifying each plug-in 50 from other plug-ins 50 is associated with each plug-in 50, which is not illustrated in FIG. 2. This plug-in ID associated with each plug-in 50 is also registered in the flow management table 21.

The job management unit 30 (see FIG. 1) includes a job management table 31, and registers information (job information) on each of processed jobs (hereinafter referred to as "past jobs") in the job management table 31.

FIG. 3 is a diagram illustrating the job management table 31.

In the present exemplary embodiment, a job ID for identifying each of the past jobs is registered in the job management table 31, as indicated by reference numeral 3A.

In addition, as information on each of the past jobs, a flow ID associated with a flow executed at the time of executing the past job, a document ID given to a processed document, and information on whether there has been a distribution process indicating whether a distribution process has been executed are registered in the job management table 31.

Although the case in which information on whether there has been a distribution process is registered is discussed here by way of example, the case is not limited to information on whether there has been a distribution process, and information on whether a document has been saved in an external service may be registered.

Note that the details of a distribution process and a save process will be described later.

The plug-in management unit 40 (see FIG. 1) includes a plug-in management table 41, and, using the plug-in management table 41, manages information on each plug-in 50.

FIG. 4 is a diagram illustrating the plug-in management table 41.

In the present exemplary embodiment, whenever a process is executed by one plug-in 50, information on this plug-in 50 is registered in the plug-in management table 41.

In the present exemplary embodiment, as illustrated in FIG. 4, for each plug-in 50, a plug-in ID, document data of a document processed by the plug-in 50, a job ID when the plug-in 50 has processed the document, the document ID of the document processed by the plug-in 50, and the flow ID of a flow associated with the plug-in 50 are registered in association with one another in the plug-in management table 41.

Here, "document data" is data including information that represents a feature of the document, such as data of the document itself. This document data may be the document data itself, or may be data indicating an extracted feature of the document.

In addition, a "document ID" is identification information that is given to each document input to the information processing system 1 and that is for identifying each document from other documents.

In the present exemplary embodiment, when one job for a document is executed, one job ID is given to this job, and a document ID is given to the document.

In the present exemplary embodiment, processes on the document are sequentially performed by plug-ins 50 associated with a flow designated by the user.

On this occasion, whenever a process is performed by one plug-in 50, the plug-in management unit 40 registers information on this plug-in 50 in the plug-in management table 41 (see FIG. 4).

Specifically, the plug-in management unit 40 registers the plug-in ID of the plug-in 50, document data of a document processed by the plug-in 50, a job ID when the plug-in 50 has processed the document, the document ID of the document processed by the plug-in 50, and the flow ID of a flow associated with the plug-in 50 in association with one another in the plug-in management table 41.

In the present exemplary embodiment, the user preliminarily registers a flow including a combination of multiple plug-ins 50. In the present exemplary embodiment, information on each of the multiple plug-ins 50 associated with the flow being registered is registered for each flow in the flow management table 21 (see FIG. 2).

In the information processing system 1 of the present exemplary embodiment, processes on a document input to the information processing system 1 are performed sequentially by plug-ins 50 associated with a flow designated by the user.

A plug-in 50 refers to software for extending the function of an application. By installing a plug-in 50 in the information processing system 1, the function of an application already installed in the information processing system 1 is extended.

Here, in the present exemplary embodiment, exemplary plug-ins 50 include a confidential box plug-in, a format conversion plug-in, an optical character reader (OCR) plug-in, a save plug-in, and a distribution plug-in.

The confidential box plug-in is a plug-in 50 for obtaining a document in a predetermined format, such as to "obtain a document in Joint Photographic Experts Group (JPEG)".

The format conversion plug-in is a plug-in 50 for converting the format of a document to another format, such as to "convert JPEG to Tagged Image File Format (TIFF)".

The OCR plug-in is a plug-in 50 for performing an OCR process on a predetermined area of a document.

The save plug-in is a plug-in 50 for saving a processed document in a folder of a designated external service (a folder outside the information processing system 1).

The distribution plug-in is a plug-in 50 for distributing (transmitting) a processed document to a designated external service (a transmission destination outside the information processing system 1).

Figure 5:
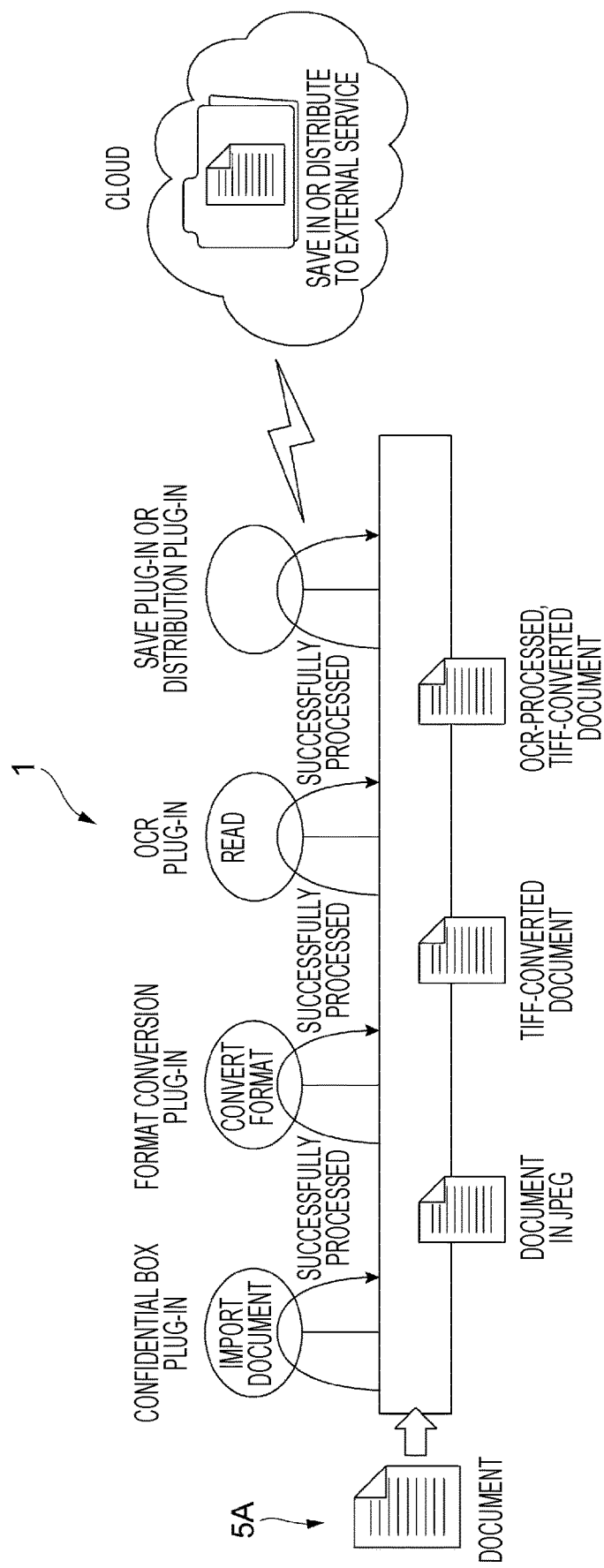
FIG. 5 is a diagram illustrating processes executed by plug-ins.

When these plug-ins 50 are associated with one flow in this order, upon execution of the flow, processes indicated in FIG. 5 (a diagram illustrating processes executed by the plug-ins 50) are performed.

At first, for example, a document (a document indicated by reference numeral 5A) scanned by a device (not illustrated) is imported by the confidential box plug-in as image data in JPEG into the information processing system 1.

Next, the format conversion plug-in converts the format of the document from JPEG to TIFF.

Next, the OCR plug-in reads characters in a predetermined area of the TIFF-converted document with the use of OCR, and outputs the TIFF-converted, OCR-processed document and the read result.

Next, the save plug-in saves the TIFF-converted, OCR-processed document and the read result in a folder of an external service on the cloud, or the distribution plug-in distributes (transmits) the TIFF-converted, OCR-processed document and the read result to a designated external service.

In addition, another exemplary flow including a combination of multiple plug-ins 50 is a flow for processing an order.

In this order processing flow, for example, the first plug-in 50 receives a purchase order that has been faxed or scanned. Next, the second plug-in 50 performs a predetermined process, such as an OCR process, on the purchase order. After that, the third plug-in 50 performs a distribution process, such as transmission of the OCR-read result and the purchase order, to an external distribution destination.

Figure 6:
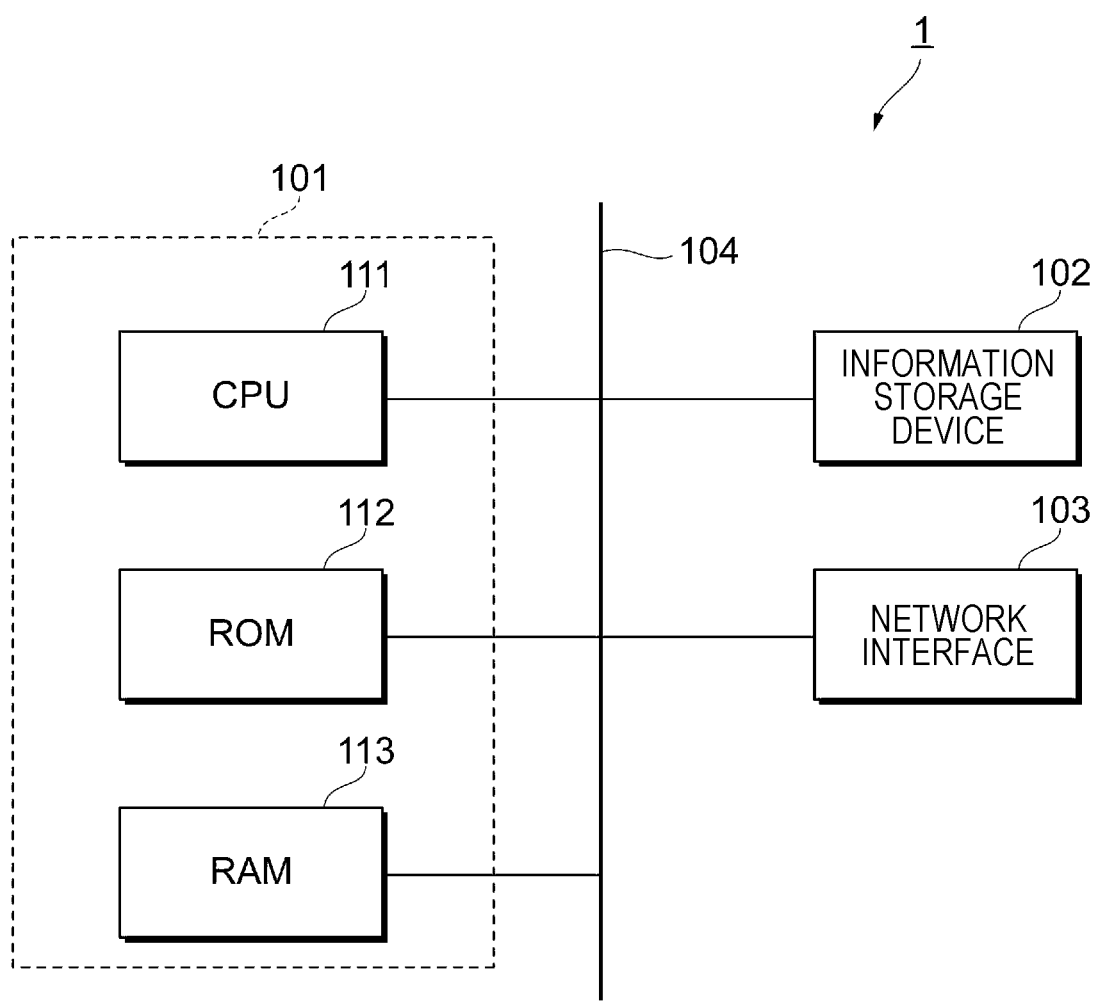
FIG. 6 is a diagram illustrating an example of the hardware configuration of the information processing system.

FIG. 6 is a diagram illustrating an example of the hardware configuration of the information processing system 1.

The information processing system 1 of the present exemplary embodiment includes an information processor 101, an information storage device 102, which stores information, and a network interface 103, which realizes communication via a local area network (LAN) cable or the like.

The information storage device 102 is realized by an existing information storage device, such as a hard disk drive. A hard disk drive is a device that reads and writes data on a non-volatile storage medium having a disc-shaped substrate whose surface is coated with a magnetic material. Needless to say, the information storage device 102 may be semiconductor memory or a magnetic tape.

The information processor 101 includes a central processing unit (CPU) 111, which is an example of a processor, read-only memory (ROM) 112, which stores basic software and the basic input/output system (BIOS), and random-access memory (RAM) 113, which is used as a work area.

The CPU 111 may be a multi-core processor. In addition, the ROM 112 may be rewritable non-volatile semiconductor memory. The information processor 101 is a so-called computer.

The information processor 101, the information storage device 102, and the network interface 103 are connected to one another through a bus 104 and a signal line (not illustrated).

Here, a program executed by the CPU 111 may be provided to the information processing system 1 by being stored in a computer readable recording medium, such as a magnetic recording medium (magnetic tape, magnetic disc, etc.), an optical recording medium (optical disc, etc.), a magneto-optical recording medium, or semiconductor memory. Alternatively, the program executed by the CPU 111 may be provided to the information processing system 1 using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the present exemplary embodiment, the CPU 111, which is an example of a processor, executes the program stored in the ROM 112 or the information storage device 102, thereby realizing the main processor 10, the flow management unit 20, the job management unit 30, and the plug-in management unit 40 described above.

In addition, in the present exemplary embodiment, the flow management table 21, the job management table 31, and the plug-in management table 41, which are illustrated in FIGS. 1 to 4, are stored in the information storage device 102.

In addition, each of the plug-ins 50 is also stored in the information storage device 102.

Figure 7:
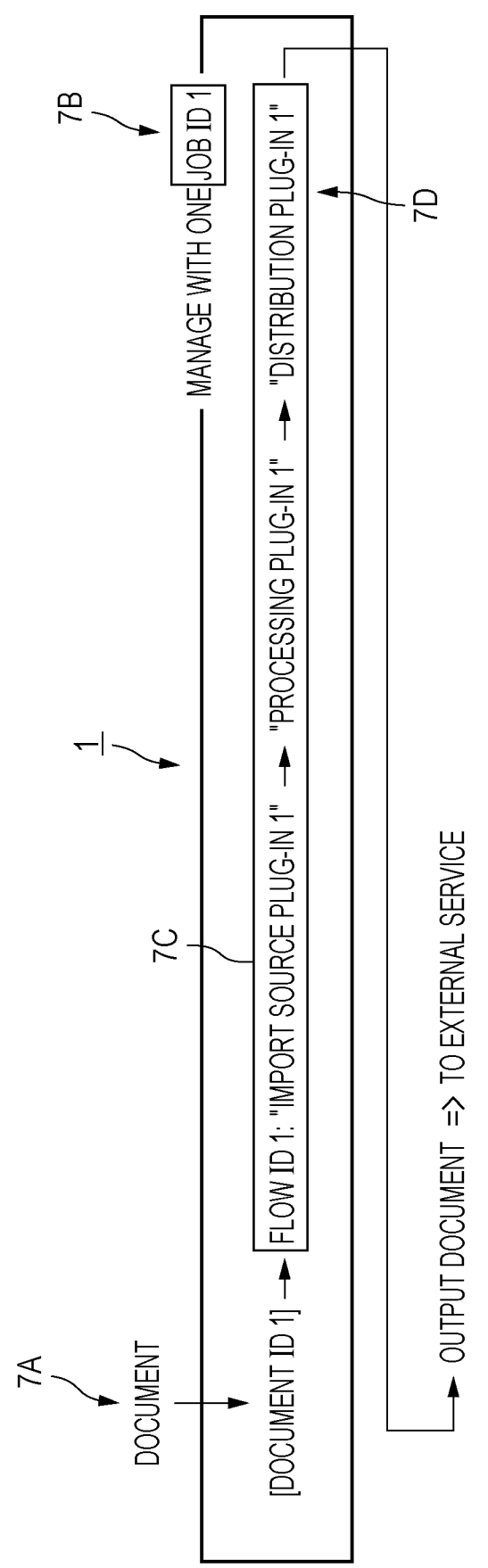
FIG. 7 is a diagram illustrating the flow of basic processing executed in an exemplary embodiment.

FIG. 7 is a diagram illustrating the flow of basic processing executed in the present exemplary embodiment.

In the processing illustrated in FIG. 7, at first, as indicated by reference numeral 7A, a document (document data) is input to the information processing system 1.

In the present exemplary embodiment, on this occasion, a job ID 1 (see reference numeral 7B), which is an example of a job ID, is given to a series of processes performed on this document. In addition, in this processing example, a document ID 1, which is an example of a document ID, is given to this input document.

Furthermore, in this processing example, processes on the input document are sequentially performed by multiple plug-ins 50 associated with a flow designated by the user (flow indicated by reference numeral 7C).

More specifically, in the present exemplary embodiment, a flow ID 1 is given to a flow designated by the user, and processes on the document are sequentially performed by multiple plug-ins 50 associated with the flow ID 1.

In this processing example, the last plug-in 50 (plug-in 50 indicated by reference numeral 7D) among these multiple plug-ins 50 is a plug-in 50 for distribution.

Therefore, in this processing example, a document that has been processed by the multiple plug-ins 50 is distributed (transmitted) to an external service (external system).

On completion of the series of processes illustrated in FIG. 7, the job management unit 30 (see FIG. 1) registers information on this processing in the job management table 31 illustrated in FIG. 3.

Specifically, on completion of the series of processes illustrated in FIG. 7, the job management unit 30 registers the job ID 1, the flow ID 1, the document ID 1, and whether there has been a distribution process "yes", which are illustrated in FIG. 7, in the job management table 31 illustrated in FIG. 3.

In addition, in the processing illustrated in FIG. 7, whenever a process is performed by one plug-in 50, the plug-in management unit 40 (see FIG. 1) registers information on each of the plug-ins 50 in the plug-in management table 41 illustrated in FIG. 4.

Specifically, whenever a process is performed by one plug-in 50, the plug-in management unit 40 registers the plug-in ID, document data (document data of a document input to the plug-in 50 and processed by the plug-in 50), the job ID 1, the document ID 1, and the flow ID 1 in the plug-in management table 41 illustrated in FIG. 4.

Figure 8:
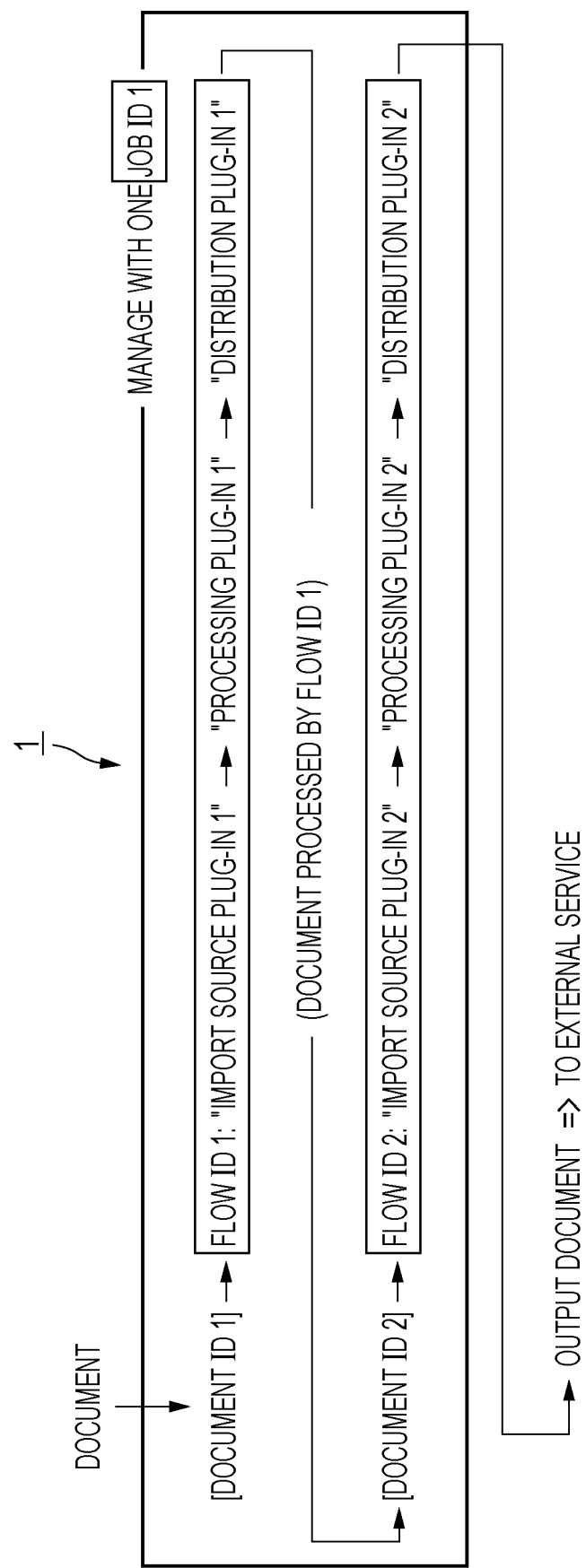
FIG. 8 is a diagram illustrating another processing example executed in the information processing system.

FIG. 8 is a diagram illustrating another processing example executed in the information processing system 1.

In this processing example, a document processed using multiple plug-ins 50 associated with the flow ID 1 is further processed using plug-ins 50 associated with a flow ID 2.

In the case of this processing, in the present exemplary embodiment, a job ID is not given to each flow, but one job ID (the job ID 1 in this example) is given.

In addition, in the present exemplary embodiment, after a document is processed by the flow with the flow ID 1, this document, which has been processed by the flow with the flow ID 1, is newly given a document ID 2.

In the case where a job illustrated in FIG. 8 (job with the job ID 1) is executed, the job management unit 30 (see FIG. 1) registers two sets of data with the same job ID (job ID 1) in the job management table 31 (see FIG. 3).

Specifically, the job management unit 30 registers the following two sets of data in the job management table 31.

Job ID 1, flow ID 1, document ID 1, and whether there has been a distribution process; and Job ID 1, flow ID 2, document ID 2, and whether there has been a distribution process In addition, in the case where the job illustrated in FIG. 8 is executed, whenever a process is performed by one plug-in 50, the plug-in management unit 40 (see FIG. 1) registers information on each of the plug-ins 50 in the plug-in management table 41 illustrated in FIG. 4.

Specifically, whenever a process is performed by a plug-in 50 associated with the flow ID 1, the plug-in management unit 40 registers the plug-in ID, document data (document data of a document input to the plug-in 50 and processed by the plug-in 50), the job ID 1, the document ID 1, and the flow ID 1 in the plug-in management table 41 illustrated in FIG. 4.

In addition, whenever a process is performed by a plug-in 50 associated with the flow ID 2, the plug-in management unit 40 registers the plug-in ID, document data (document data of a document input to the plug-in 50 and processed by the plug-in 50), the job ID 1, the document ID 2, and the flow ID 2 in the plug-in management table 41 illustrated in FIG. 4.

In the information processing system 1 of the present exemplary embodiment, there is a risk that a save process of saving a document in an external service or a distribution process of distributing a document to an external service may be unintentionally performed multiple times, and accordingly, a save process on the same document may be performed multiple times, or a distribution process on the same document may be performed multiple times.

Specifically, there is a risk that the user may re-execute a job even though the job is completed normally, and accordingly, a save process on the same document may be performed multiple times, or a distribution process on the same document may be performed multiple times.

More specifically, in the present exemplary embodiment, in the case were a time point at which the main processor 10 determines that a timeout has occurred and a time point at which a job is completed are close to each other, a timeout may be determined even though the job has been completed normally.

In this case, an error is reported to the user, and the user re-executes the job even though the job has actually been completed normally.

In this case, as described above, a save process on the same document may be performed multiple times, or a distribution process on the same document may be performed multiple times.

Thus, in the present exemplary embodiment, this type of saving multiple times or distribution multiple times is prevented by performing the following processes.

Figure 9:
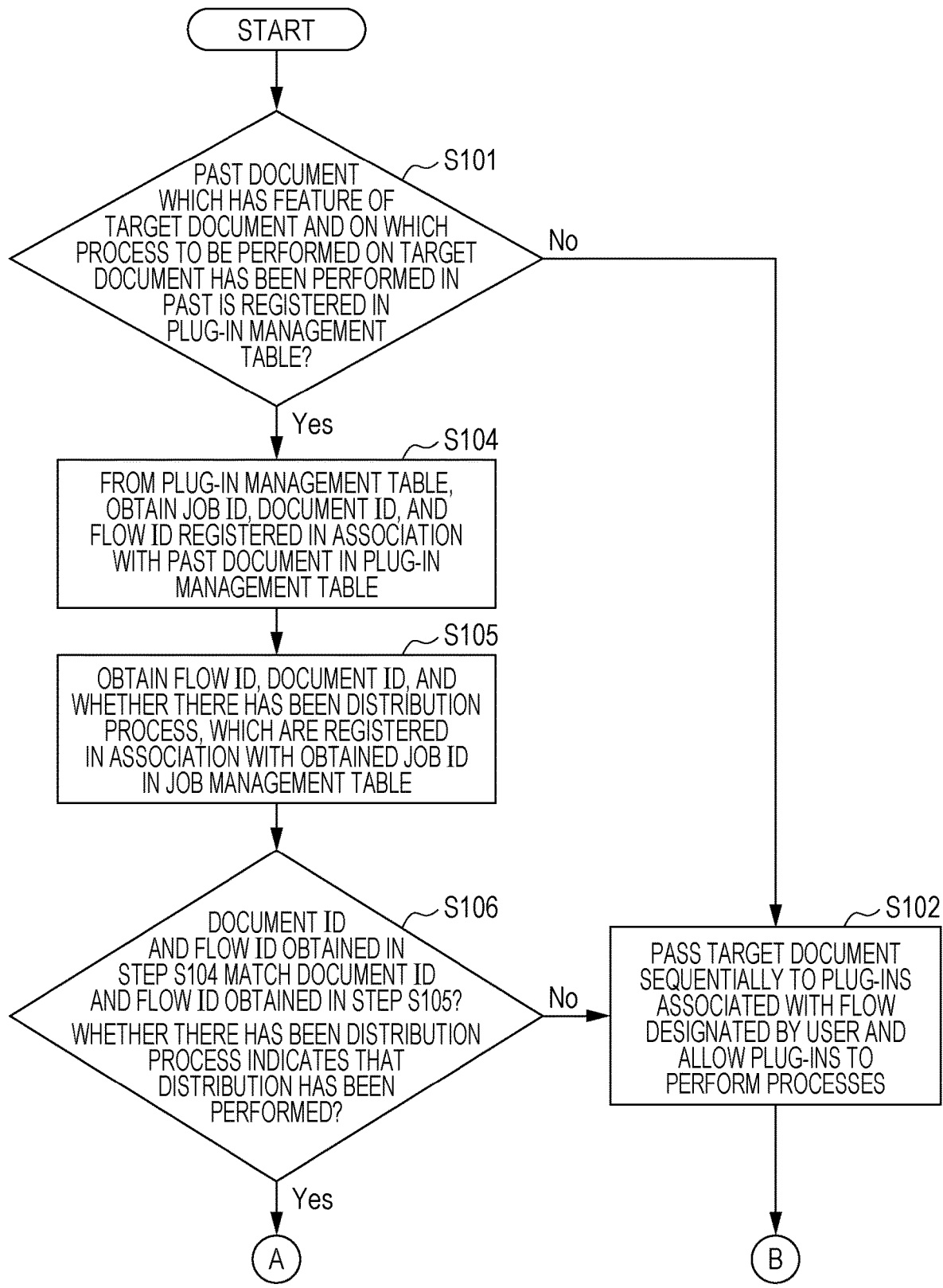
FIG. 9 is a flowchart illustrating the flow of processes executed by the information processing system when executing a new job.
Figure 10:
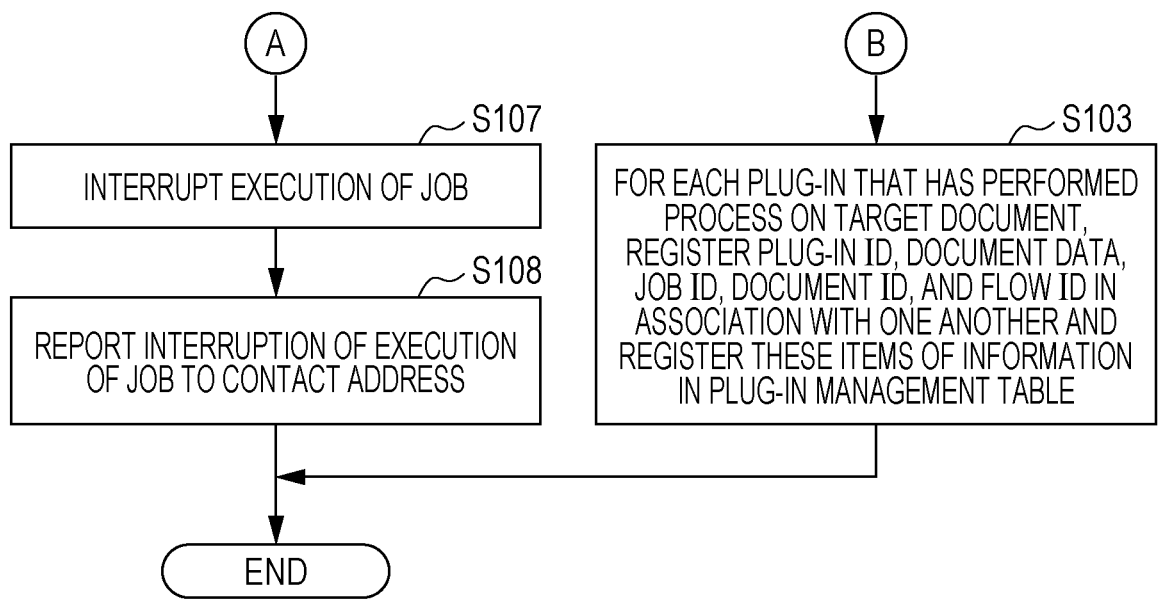
FIG. 10 is a flowchart illustrating the flow of processes executed by the information processing system when executing a new job.

FIGS. 9 and 10 are flowcharts each illustrating the flow of processes executed by the information processing system 1 when executing a new job.

Note that the processes illustrated in each of FIGS. 9 and 10 are performed by the main processor 10, the flow management unit 20, the job management unit 30, and the plug-in management unit 40. In other words, each of the processes illustrated in FIG. 9 is performed by the CPU 111 (see FIG. 6), which is an example of a processor realizing these functional units.

In the present exemplary embodiment, at first, in response to an input of a target document, which is a document to be processed, to the information processing system 1, the main processor 10 obtains this target document. At this time, the main processor 10 also obtains information on a flow selected by the user.

Next, the main processor 10 asks the plug-in management unit 40 (see FIG. 1) about whether the same document as the obtained target document is registered in the plug-in management table 41 (see FIG. 4).

In other words, the main processor 10 asks the plug-in management unit 40 about whether a document that has a feature of the obtained target document is registered in the plug-in management table 41.

In the present exemplary embodiment, as illustrated in FIG. 4, documents that have been processed in the past in the information processing system 1 (hereinafter referred to as "past documents") are registered in the plug-in management table 41.

The plug-in management unit 40 refers to the plug-in management table 41, and determines whether a document (past document) which is the same document as the target document and on which a process to be performed on the target document has been performed in the past is registered in the plug-in management table 41.

In other words, as illustrated in step S101 in FIG. 9, the plug-in management unit 40 determines whether a past document which has a feature of the target document and on which a process to be performed on the target document has been performed in the past is registered in the plug-in management table 41.

In the case of performing the process in step S101, the plug-in management unit 40 first obtains (grasps) a feature of the target document.

Then, the plug-in management unit 40 determines whether a past document which has the obtained feature and on which a process to be performed on the target document has been performed in the past is registered in the plug-in management table 41.

More specifically, the plug-in management unit 40 determines whether document data (document data of a past document) whose similarity with document data of the target document exceeds a predetermined threshold and which is associated with a plug-in ID that matches the plug-in ID of a plug-in 50 that performs a process on the target document is registered in the plug-in management table 41.

In the case where the plug-in management unit 40 determines that no document data whose similarity with document data of the target document exceeds a predetermined threshold and which is associated with a plug-in ID that matches the plug-in ID of a plug-in 50 that performs a process on the target document is registered in the plug-in management table 41, the plug-in management unit 40 reports the "main processor 10" the fact that no such past document is registered.

In other words, in the case where the plug-in management unit 40 determines that no past document which has a feature of the target document and on which a process to be performed on the target document has been performed in the past is registered in the plug-in management table 41, the plug-in management unit 40 reports the "main processor 10" the fact that no such past document is registered.

In this case, the main processor 10 passes the target document sequentially to the plug-ins 50 associated with a flow designated by the user and allows these plug-ins 50 to perform processes (step S102).

In other words, in the present exemplary embodiment, in the case where it is determined in step S101 that no past document which has a feature of the target document and on which a process to be performed on the target document has been performed in the past is registered in the plug-in management table 41, the process in step S102 is performed, and processes on the target document are performed by a plurality of plug-ins 50.

In this case (in the case where each of the plug-ins 50 is allowed to perform a process on the target document), the main processor 10 registers information on each of the plug-ins 50 that have performed the processes on the target document in the plug-in management table 41 (see FIG. 4).

Specifically, in this case, for each of the plug-ins 50 that have performed the processes, the main processor 10 passes the plug-in ID, the document data, the job ID, the document ID, and the flow ID to the plug-in management unit 40.

In this case, the plug-in management unit 40 registers these passed items of information in the plug-in management table 41.

Specifically, for each of the plug-ins 50 that have performed the processes on the document, the plug-in management unit 40 associates the plug-in ID, the document data, the job ID, the document ID, and the flow ID with one another, and registers these items of information in the plug-in management table 41 (step S103).

In this case (in the case where each of the plug-ins 50 is allowed to perform a process on the target document), the main processor 10 registers information on a job for performing processing on the target document in the job management table 31 (see FIG. 3).

Specifically, the main processor 10 passes the job ID, the flow ID, the document ID, and information on whether there has been a distribution process to the job management unit 30. The job management unit 30 registers these items of information in the job management table 31.

In contrast, in the case where it is determined in step S101 that a past document which has a feature of the target document and on which a process to be performed on the target document has been performed in the past is registered, the flow proceeds to the process in step S104.

In step S104, the plug-in management unit 40 obtains, from the plug-in management table 41, the job ID, the document ID, and the flow ID that are registered in association with this past document in the plug-in management table 41.

In other words, the plug-in management unit 40 obtains, from the plug-in management table 41, the job ID, the document ID, and the flow ID registered in the plug-in management table 41 in association with a past document that has a feature of the target document and that has been processed in the past in the information processing system 1.

Next, in the present exemplary embodiment, the job management unit 30 obtains the flow ID, the document ID, and information on whether there has been a distribution process, which are registered in association with the job ID obtained in step S104 in the job management table 31 (step S105).

More specifically, in the present exemplary embodiment, in response to obtaining of the job ID in step S104, this job ID is reported to the job management unit 30.

In this case, the job management unit 30 refers to the job management table 31, and obtains the flow ID, the document ID, and information on whether there has been a distribution process, which are associated with this job ID.

In other words, in this case, the job management unit 30 obtains, on the basis of the job ID, information on a process performed in the past by the information processing system 1 on a past document that has a feature of the target document.

In other words, in this case, the job management unit 30 obtains information on a process performed by the information processing system 1 on a past document which has a feature of the target document and on which a process that is the same as a process to be performed on the target document (a process performed by a plug-in 50) has been performed in the past.

In other words, in this case, the job management unit 30 obtains information on a process performed in the past by the information processing system 1 on a past document which is a document that has a feature of the target document and that has been processed in the past in the information processing system 1.

More specifically, in the present exemplary embodiment, as "information on a process performed in the past", information on whether there has been a distribution process is obtained.

Furthermore, in the present exemplary embodiment, in addition to this information on whether there has been a distribution process, the flow ID and the document ID registered in association with the past document in the job management table 31 are obtained.

In the process in step S106, the main processor 10 determines whether the document ID and the flow ID obtained in step S104 respectively match the document ID and the flow ID obtained in step S105.

In other words, in step S106, it is determined whether the document ID and the flow ID obtained from the plug-in management table 41 respectively match the document ID and the flow ID obtained from the job management table 31.

In the process in step S106, the main processor 10 also determines whether information on whether there has been a distribution process, which is obtained in step S105, is information indicating that distribution has been performed.

In other words, in the process in step S106, the main processor 10 determines whether the information on whether there has been a distribution process, which is obtained from the job management table 31, is information indicating that distribution has been performed.

In the case where it is determined in the process in step S106 that at least one of the document ID and the flow ID does not match, the flow proceeds to the process in step S102.

Even if both the document ID and the flow ID match in step S106, if the information on whether there has been a distribution process, which is obtained in step S105, is not information indicating that distribution has been performed, the flow proceeds to the process in step S102.

In the process in step S102, as described above, the main processor 10 passes the target document sequentially to plug-ins 50 associated with a flow designated by the user to allow the plug-ins 50 to perform processes.

In this case, the process in step S103 is further performed, and, for each of the plug-ins 50 that have performed the processes on the target document, the plug-in ID, the document data, the job ID, the document ID, and the flow ID are associated with one another, and these items of information are registered in the plug-in management table 41.

In this case, as described above, the job ID, the flow ID, the document ID, and information on whether there has been a distribution process are also registered in the job management table 31.

In contrast, in step S106, in the case where the document ID and the flow ID obtained from the plug-in management table 41 respectively match the document ID and the flow ID obtained from the job management table 31, and information on whether there has been a distribution process is information indicating that distribution has been performed, the flow proceeds to the process in step S107.

In the process in step S107, the main processor 10 interrupts the execution of the job in order to prevent a distribution process from being performed multiple times.

In this case, the main processor 10 reports a predesignated contact address the fact that the execution of the job has been interrupted (step S108).

Note that how this is reported is not particularly limited. For example, email may be used, or a social networking service (SNS) may be used.

In this case, a user who has been reported checks the contents of the interrupted job, and, for example, determines whether to continue the processing of the job as it is (whether to allow to resume the job), or to cancel the job.

In the case where the user allows to resume the job, the user reports the resumption to the information processing system 1, and, on receipt of the report, the main processor 10 resumes the interrupted job.

In the present exemplary embodiment, basically, in the case where a process performed by the information processing system 1 on the past document includes a distribution process or a save process, which is an example of a process that involves transmission of information to the outside, this distribution process or save process is not allowed to be performed on the target document.

In other words, in the present exemplary embodiment, in the case where a process performed by the information processing system 1 on the past document includes a particular process such as a distribution process or a save process, this particular process is not allowed to be performed on the target document.

In doing so, the same document is suppressed from being re-distributed or re-saved.

In contrast, in the present exemplary embodiment, even in the case where a process performed by the information processing system 1 on the past document includes this particular process, if a predetermined condition is satisfied, such as when the user gives permission, this particular process is allowed to be performed on the target document.

Here, the case in which, due to the above-described timeout, an error is reported to the user, and the job is re-executed will be assumed.

In this case, in the present exemplary embodiment, the same document as a document that has been input to the information processing system 1 at the time the error has occurred is input again to the information processing system 1.

On this occasion, the user again designates the flow of processing the document.

In the present exemplary embodiment, on the basis of these items of information, it is determined whether a save process or a distribution process has already been performed on the document in the past.

If it is found out that a save process or a distribution process has already been performed, it may be possible to suppress a save process or a distribution process from being performed again by interrupting the job.

Here, whether a save process or a distribution process has been performed in the past is registered in the rightmost field of the job management table 31 (see FIG. 3), and, basically, whether a save process or a distribution process has been performed in the past is found out by referring to information registered in this rightmost field.

However, on re-execution of the job, as described above, only a document and information on the flow are input to the information processing system 1 in the present exemplary embodiment.

In this case, even with reference to the job management table 31, it may not be possible to determine whether a save process or a distribution process has been performed on this document in the past.

Specifically, in the present exemplary embodiment, although information on the flow is registered in the job management table 31, document data is not registered, and it may not be possible to narrow down to and specify one past job only by knowing document data and information on the flow.

In other words, although past jobs may somehow be narrowed down by referring to the job management table 31 only on the basis of information on the flow in the present exemplary embodiment, it is assumed that the same flow is registered multiple times in the job management table 31, and it is difficult to specify one past job only on the basis of information on the flow.

Therefore, in the present exemplary embodiment, when a target document and information on the flow are obtained, reference is made to the plug-in management table 41.

In the present exemplary embodiment, it is determined whether past document data whose similarity with document data of the target document exceeds a threshold and on which a process to be performed on the target document has been performed in the past is registered in the plug-in management table 41.

If such past document data is registered, the job ID, the flow ID, and the document ID associated with this registered document data are grasped.

In doing so, the job ID is obtained.

In this case, basically, if reference is made to the job management table 31 on the basis of the job ID, it may be possible to grasp whether a save process or a distribution process has been performed in the past in a job (past job) specified by the job ID.

By the way, in the present exemplary embodiment, as described above, two sets of data with the same job ID may be registered in the job management table 31.

In this case, as described above, even if a job ID is obtained from the plug-in management table 41, it may not be possible to narrow down to one past job.

In the present exemplary embodiment, as described above, the past job is specified by taking into consideration not only the job ID, but also the document ID and the flow ID. In doing so, even in the case where items of data on two past jobs with the same job ID are registered in the job management table 31, one past job may be specified.

Although the case in which one past job is specified by using both the flow ID and the document ID has been described in the present exemplary embodiment, only one of the flow ID and the document ID may be used.

In the information processing system 1 of the present exemplary embodiment, as a job is executed and a document is processed, a job ID, which is an example of job identification information which is information for identifying the job from other jobs, is associated with this document.

Therefore, in the present exemplary embodiment, the job ID associated with the above-mentioned past document may be grasped, and, on the basis of the grasped job ID, information on a process performed by the information processing system 1 on the past document may be obtained.

By the way, in this case, as described above, two sets of data with the same job ID may be registered in the job management table 31, and it may happen to be not possible to narrow down to one past job.

To this end, in the present exemplary embodiment, as described above, narrowing down to one past job is performed by using at least one of the flow ID and the document ID.

In the information processing system 1 of the present exemplary embodiment, a document ID, which is an example of document identification information which is information for identifying a to-be-processed document from other documents, is associated with each document.

In the present exemplary embodiment, besides a job ID, which is an example of the above-mentioned job identification information, a document ID, which is an example of document identification information associated with a past document, is also grasped.

In the present exemplary embodiment, as described above, in the case of narrowing down to one past job, narrowing down to one past job is performed by also using the grasped document ID. Information on a process performed by the information processing system 1 on this past job is obtained.

In the information processing system 1 of the present exemplary embodiment, information on a plurality of processes performed sequentially on a document may be registered in units of these multiple processes, and multiple units may be registered.

More specifically, in the present exemplary embodiment, a process on a document is performed by a plug-in 50, and furthermore, information on a plurality of plug-ins 50 that sequentially perform processes on a document may be registered in units of these multiple plug-ins 50, and multiple units may be registered.

Furthermore, in the present exemplary embodiment, for each of these units, a flow ID, which is an example of unit identification information which is information for identifying the unit from other units, is given. Furthermore, for a document on which processes by one unit are performed, a flow ID corresponding to this one unit is associated.

In the present exemplary embodiment, besides a job ID, which is an example of job identification information, a flow ID, which is an example of unit identification information associated with a past document, is also grasped.

In the present exemplary embodiment, as described above, in the case of narrowing down to one past job, narrowing down to one past job is performed by also using the grasped flow ID.

Information on a process performed by the information processing system 1 on this past job is obtained.

In the present exemplary embodiment, whether the obtained information on a process includes information indicating that a save process or a distribution process has been performed is grasped.

In other words, it is determined whether a save process or a distribution process has been performed in one past job specified on the basis of a job ID, a document ID, and a flow ID.

If a save process or a distribution process has been performed, the job is interrupted, as described above.

As another processing example, a past job may be specified only on the basis of the above-mentioned job ID grasped by referring to the plug-in management table 41, instead of using a flow ID or a document ID.

In other words, in the present exemplary embodiment, the process of specifying a past job only on the basis of a job ID is not to be excluded, and a past job may be specified only on the basis of a job ID.

In the case of specifying a past job only on the basis of a job ID, no problem arises if there is only one past job to be specified.

In this case, if a save process or a distribution process has been performed in this one past job, execution of the job is interrupted. In contrast, if neither save process nor distribution process has been performed, the job is performed to the end.

In contrast, in the case of specifying a past job only on the basis of a job ID, there may be plural jobs to be specified.

In such a case, as described above, for example, execution of the job is interrupted, and the interruption of the execution of the job is reported to a predesignated contact address.

In this case, the user is asked about what kind of process is to be performed thereafter. In response to a reply from the user, the main processor 10 re-executes the job or cancels the execution of the job in accordance with the reply.

Others

It is preferable that the processes illustrated in FIGS. 9 and 10 be performed when a process by a predetermined particular plug-in 50, among a plurality of plug-ins 50 associated with a flow designated by the user, is performed.

More specifically, it is preferable that the processes illustrated in FIGS. 9 and 10 be performed when a process by a plug-in 50 other than a plug-in 50 that performs the first process, among a plurality of plug-ins 50 associated with a flow designated by the user, is performed.

In other words, it is preferable that the processes illustrated in FIGS. 9 and 10 be performed when a process by a plug-in 50 that performs the second or subsequent process, such as a plug-in 50 that performs the second process or a plug-in 50 that performs the last process, among a plurality of plug-ins 50 associated with a flow designated by the user, is performed.

In the information processing system 1 of the present exemplary embodiment, the target document is transferred to each of a plurality of plug-ins 50 that sequentially perform processes on the target document, and the processed target document output from each of the plug-ins 50 is sequentially obtained.

In this case, in the process in step S101, in the case of obtaining a feature of the target document, it is preferable to obtain a feature of the target document transferred to a predetermined particular plug-in 50, among the plurality of plug-ins 50.

In other words, in the case of determining whether a past document that has a feature of the target document is registered in the plug-in management table 41 in the process in step S101 described above, a feature of the target document transferred to a particular plug-in 50, such as a plug-in 50 that performs the second or subsequent process, is obtained.

It is then determined whether a past document that has this feature is registered in the plug-in management table 41.

Alternatively, in the case of determining whether a past document that has a feature of the target document is registered in the plug-in management table 41 in the process in step S101, a feature of the target document transferred to a plug-in 50 that performs the last process, among a plurality of plug-ins 50, is obtained.

It is then determined whether a past document that has this feature is registered in the plug-in management table 41.

In the present exemplary embodiment, after executing a job for the first time, for example, the user may edit the flow and then re-execute the job in order to achieve better results.

More specifically, for example, after adding another plug-in 50 to the flow, changing the setting contents of a plug-in 50, or deleting a plug-in 50 from the flow, the user may re-designate the flow and re-execute the job.

In the present exemplary embodiment, even if the user edits the flow, the name of the flow designated by the user (name displayed on a user interface (UI) (operation screen) when the user designates the flow), the flow ID, and the like remain unchanged.

In the case where the flow is edited by the user, it may be considered that another process is to be actually performed. In this case, if the job is re-executed, it is preferable to prevent interruption of the job, and to perform processing up to a save process or a distribution process.

However, in the present exemplary embodiment, even if the flow is edited, the job may be interrupted, and a save process or a distribution process may not be performed.

Specifically, in the present exemplary embodiment, even if the user edits the flow, a document to be processed by the first plug-in 50 is not affected by the edition of the flow, and is the target document itself obtained upon re-execution of the job.

In this case, if the processes illustrated in FIGS. 9 and 10 are performed on the basis of this target document, it is determined in step S101 that a past document which has a feature of the target document and on which a process to be performed on the target document has been performed in the past is registered in the plug-in management table 41.

In other words, in this case, it is determined that document data whose similarity with document data of the target document exceeds a predetermined threshold is registered in the plug-in management table 41.

In this case, the flow proceeds to the processing from step S104 onward, and, in step S106, it is determined that the document ID and the flow ID obtained from the plug-in management table 41 respectively match the document ID and the flow ID obtained from the job management table 31.

In the case where it is further determined in step S106 that information on whether there has been a distribution process is information indicating that distribution has been performed (in the case where it is further determined that a distribution process has been executed), the job is interrupted.

In contrast, as described above, if the processes illustrated in FIGS. 9 and 10 are performed when the second or subsequent plug-in 50 or the last plug-in 50 is executed, interruption of the job is less likely to occur.

Specifically, as described above, if the flow is edited, the target document input to the second or subsequent plug-in 50 or the last plug-in 50 changes.

In this case, it is determined in step S101 that no past document which has a feature of the target document and on which a process to be performed on the target document has been performed in the past is registered in the plug-in management table 41.

In other words, it is determined that document data whose similarity with document data of the target document exceeds a predetermined threshold is not registered in the plug-in management table 41.

In this case, the process in step S102 is executed, and the job is executed to the end without being interrupted. In other words, the job whose flow has been edited is executed to the end without being interrupted.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   a processor configured to:
   obtain a feature of a target document which is a document to be processed;
   obtain information on a process performed by the information processing system on a past document which is a document that has the obtained feature and that has been processed in past in the information processing system; and
   in a case where a process performed by the information processing system on the past document includes a particular process, not allow the particular process to be performed on the target document.

2. The information processing system according to claim 1, wherein the processor is configured to:
   obtain information on a process performed by the information processing system on the past document which has the feature of the target document and on which a process to be performed on the target document has been performed in the past.

3. The information processing system according to claim 1, wherein the processor is configured to:
   in a case where a process performed by the information processing system on the past document includes the particular process, if a predetermined condition is satisfied, allow the particular process to be performed on the target document.

4. The information processing system according to claim 1, wherein the particular process is a process that involves transmission of information to outside.

5. The information processing system according to claim 1, wherein:
   in the information processing system, the target document is transferred to each of a plurality of plug-ins that sequentially perform processes on the target document, and the processed target document output from each of the plug-ins is sequentially obtained, and
   the processor is configured to, in obtaining a feature of the target document, obtain a feature of the target document transferred to a predetermined particular plug-in, among the plurality of plug-ins.

6. The information processing system according to claim 5, wherein the processor is configured to obtain a feature of the target document transferred to a plug-in that performs a second or subsequent process, among the plurality of plug-ins.

7. The information processing system according to claim 6, wherein the processor is configured to obtain a feature of the target document transferred to a plug-in that performs a last process, among the plurality of plug-ins.

8. An information processing system comprising:
   a processor configured to:
   obtain a feature of a target document which is a document to be processed; and
   obtain information on a process performed by the information processing system on a past document which is a document that has the obtained feature and that has been processed in past in the information processing system, wherein:
   in the information processing system, as a job is executed and a document is processed, job identification information which is information for identifying the job from other jobs is associated with the document, and
   the processor is configured to:
   grasp the job identification information associated with the past document; and
   obtain information on a process performed by the information processing system on the past document based on the grasped job identification information.

9. The information processing system according to claim 8, wherein:
- in the information processing system, document identification information which is information for identifying a to-be-processed document from other documents is associated with each document, and
- the processor is configured to:
  - grasp the document identification information associated with the past document, besides the job identification information; and
  - obtain information on a process performed by the information processing system on the past document based on the grasped job identification information and the grasped document identification information.

10. The information processing system according to claim 8, wherein:
- in the information processing system, information on a plurality of processes sequentially performed on a document is registrable in units of the plurality of processes, and multiple units are registrable; for each of the units, unit identification information which is information for identifying the unit from other units is given; and, furthermore, for a document on which processes by one unit are performed, the unit identification information corresponding to the one unit is associated, and
- the processor is configured to:
  - grasp the unit identification information associated with the past document, besides the job identification information; and
  - obtain information on a process performed by the information processing system on the past document based on the grasped job identification information and the grasped unit identification information.

11. A non-transitory computer readable medium storing instructions which, when executed by a computer, causes the computer to:
- obtain a feature of a target document which is a document to be processed;
- obtain information on a process performed by the information processing system on a past document which is a document that has the obtained feature and that has been processed in past in the information processing system; and
- in a case where a process performed by the information processing system on the past document includes a particular process, not allow the particular process to be performed on the target document.

* * * * *